US008878410B2

(12) United States Patent
Utaka (10) Patent No.: US 8,878,410 B2
(45) Date of Patent: Nov. 4, 2014

(54) ROTOR WITH REINFORCING PORTIONS FOR AN ELECTRIC ROTATING MACHINE

(75) Inventor: Ryosuke Utaka, Takahama (JP)

(73) Assignee: Denso Corporation, Kariya (JP)

( * ) Notice: Subject to any disclaimer, the term of this patent is extended or adjusted under 35 U.S.C. 154(b) by 161 days.

(21) Appl. No.: 13/106,128

(22) Filed: May 12, 2011

(65) Prior Publication Data

US 2011/0278977 A1  Nov. 17, 2011

(30) Foreign Application Priority Data

May 12, 2010  (JP) ................................ 2010-110286
Apr. 13, 2011  (JP) ................................ 2011-089116

(51) Int. Cl.
*H02K 1/27* (2006.01)
*H02K 21/14* (2006.01)

(52) U.S. Cl.
CPC ................................ *H02K 1/2766* (2013.01)
USPC ................................ 310/156.53; 310/156.57

(58) Field of Classification Search
CPC .......... H02K 1/27; H02K 21/12; H02K 21/14
USPC .......................... 310/156.53, 156.54, 156.57
IPC .................................... H02K 1/27, 21/12, 21/14
See application file for complete search history.

(56) References Cited

U.S. PATENT DOCUMENTS

| 7,105,971 B2 * | 9/2006 | Asai et al. ................ 310/156.53 |
| 7,282,827 B2 * | 10/2007 | Futami ..................... 310/156.57 |
| 2006/0043812 A1 * | 3/2006 | Cheong et al. .......... 310/156.53 |
| 2007/0145850 A1 * | 6/2007 | Hsu .......................... 310/156.53 |
| 2009/0066181 A1 * | 3/2009 | Abel et al. ............... 310/156.53 |
| 2009/0134732 A1 * | 5/2009 | Shichijoh et al. ........ 310/156.53 |
| 2011/0241468 A1 * | 10/2011 | Inagaki et al. ........... 310/156.32 |
| 2011/0278977 A1 * | 11/2011 | Utaka ....................... 310/156.53 |
| 2011/0316378 A1 * | 12/2011 | Matt et al. ................ 310/156.53 |

FOREIGN PATENT DOCUMENTS

| JP | 2006-254599 | 9/2006 |
| JP | 2006-311772 | 11/2006 |
| JP | 2009-100634 | 5/2009 |

OTHER PUBLICATIONS

Office Action in Japanese App. No. 2011-089116 dated May 27, 2014 (with partial English translation).

* cited by examiner

*Primary Examiner* — Michael Andrews
(74) *Attorney, Agent, or Firm* — Nixon & Vanderhye P.C.

(57) ABSTRACT

A rotor includes a hollow cylindrical rotor core and permanent magnets embedded in the rotor core to form a plurality of magnetic poles on the radially outer periphery of the rotor core. The rotor core has a plurality of openings each of which extends in the axial direction of the rotor core so as to penetrate it. When viewed along the axial direction, each of the openings is symmetrically positioned with respect to the centerline of a corresponding one of the magnetic poles. For each of the openings, there are provided n reinforcing portions, where n is an integer not less than 2. The n reinforcing portions extend to connect a pair of radially-inner and radially-outer peripheral portions of the rotor core, thereby partitioning the opening into (n+1) parts. The n reinforcing portions are symmetrically arranged with respect to the centerline of the corresponding magnetic pole.

8 Claims, 8 Drawing Sheets

FIG.11
(1ST INVESTIGATIVE EXAMPLE)

FIG.12

(2ND INVESTIGATIVE EXAMPLE)

ROTOR WITH REINFORCING PORTIONS FOR AN ELECTRIC ROTATING MACHINE

CROSS-REFERENCE TO RELATED APPLICATIONS

This application is based on and claims priority from Japanese Patent Applications No. 2010-110286 filed on May 12, 2010 and No. 2011-89116 filed on Apr. 13, 2011, the contents of which are hereby incorporated by reference in their entireties into this application.

BACKGROUND

1. Technical Field

The present invention relates to rotors for electric rotating machines that are used in, for example, motor vehicles as electric motors and electric generators.

2. Description of Related Art

Interior Permanent Magnet (IPM) motors, such as the one disclosed in Japanese Patent Application Publication No. 2006-254599, generally have a plurality of permanent magnets embedded in a rotor core thereof along the circumferential direction of the rotor core.

Figure 9:
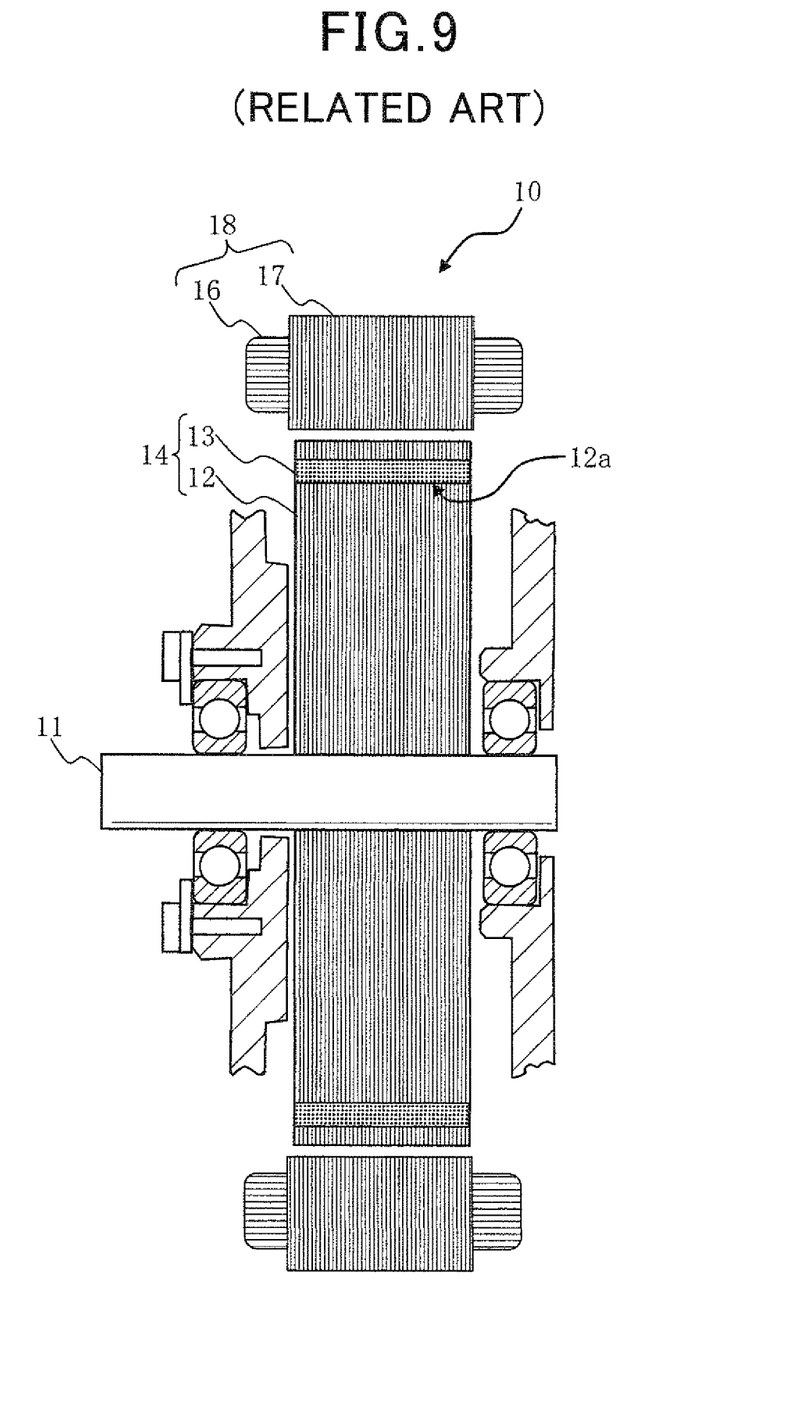
FIG. 9 is a schematic, partially cross-sectional view of a conventional IPM motor.

FIG. 9 shows the overall configuration of a conventional IPM motor 10. As shown in the figure, the motor 10 includes a rotating shaft 11, a rotor 14 and a stator 18.

The rotor 14 includes a hollow cylindrical rotor core 12 and a plurality of permanent magnets 13. The rotor core 12 is formed by laminating a plurality of annular magnetic steel sheets in the axial direction and coaxially fixed on the rotating shaft 11. The permanent magnets 13 are embedded in the rotor core 12 so as to form a plurality of magnetic poles which are spaced in the circumferential direction of the rotor core 12 at predetermined intervals and the polarities of which alternate between north and south in the circumferential direction.

The stator 18 includes a hollow cylindrical stator core 17 and a stator coil 16. The stator core 17 has a plurality of slots (not shown) that are formed in the radially inner surface of the stator core 17 and spaced in the circumferential direction of the stator core 17 at predetermined intervals. The stator core 17 is coaxially disposed radially outside the rotor core 12 with a predetermined annular gap formed between the rotor core 12 and the stator core 17. The stator coil 16 is mounted on the stator core 17 so as to be partially received in the slots of the stator core 17.

Figure 10:
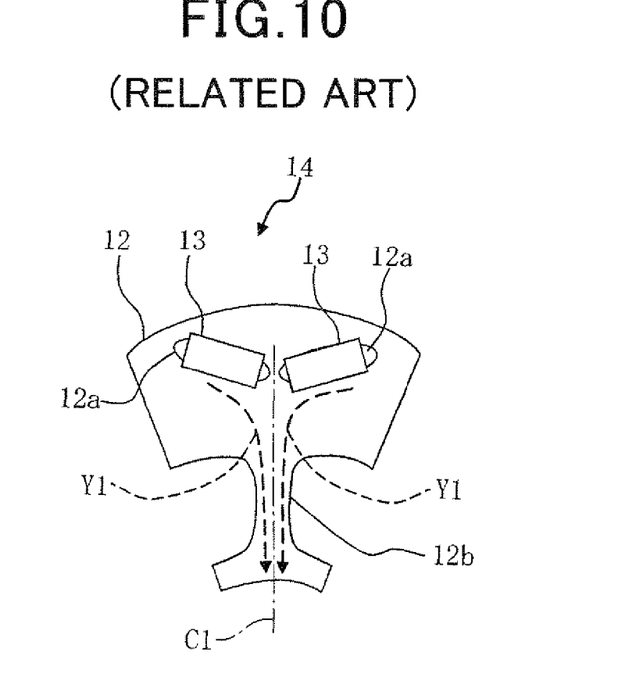
FIG. 10 is an axial end view of part of a rotor of the conventional IPM motor.

Referring now to FIG. 10, the rotor core 12 has a plurality of pairs of through-holes 12a that are formed in the vicinity of the radially outer periphery of the rotor core 12. Each of the through-holes 12a extends in the axial direction of the rotor core 12 to penetrate the rotor core 12. The pairs of the through-holes 12a are spaced in the circumferential direction of the rotor core 12 at predetermined intervals. Moreover, each pair of the through-holes 12a is arranged so as to form a substantially truncated V-shape that opens toward the radially outer periphery of the rotor core 12. Each of the permanent magnets 13 is held in a corresponding one of the through-holes 12a of the rotor core 12 so as to extend in the axial direction of the rotor core 12. Moreover, for each pair of the through-holes 12a of the rotor core 12, the two permanent magnets 13 which are respectively held in the pair of the through-holes 12a together form one of the magnetic poles on the radially outer periphery of the rotor core 12. Further, when viewed along the axial direction of the rotor core 12, the two permanent magnets 13 are symmetrically arranged and extend obliquely with respect to a centerline C1 of the magnetic pole which bisects the magnetic pole in the circumferential direction of the rotor core 12. In addition, the rotor core 12 further has a plurality of pier portions 12b each of which is formed to extend radially inward from an annular portion of the rotor core 12, in which the permanent magnets 13 are embedded, along the centerline C1 of a corresponding one of the magnetic poles.

With the above configuration of the rotor 14, it is possible to utilize reluctance torque that is generated due to the anisotropy in magnetic reluctance of the rotor 14.

However, in the rotor 14, the magnetic flux generated by each pair of the permanent magnets 13 will leak radially inward (i.e., toward the rotating shaft 11) via the corresponding pier portion 12b of the rotor core 12, as indicated with arrowed dashed lines Y1 in FIG. 10. Consequently, the available reluctance torque will be reduced.

Figure 11:
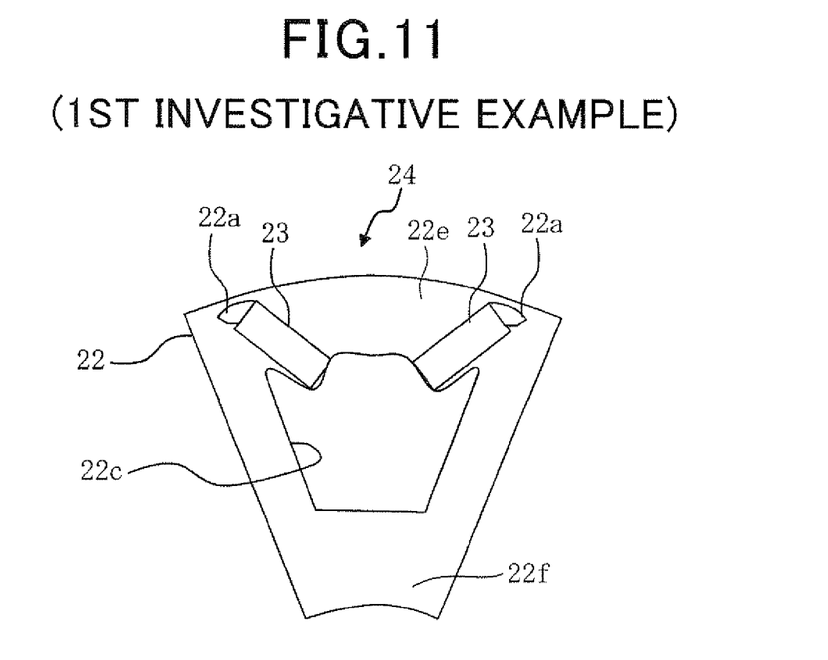
FIG. 11 is an axial end view of part of a rotor according to a first investigative example.

To solve the above problem, it is possible to configure a rotor 24 as shown in FIG. 11. Specifically, in the rotor 24, for each pair of the permanent magnets 23, there is formed a large opening 22c radially inside the central portion of the magnetic pole made up of the pair of the permanent magnets 23. The opening 22c extends in the axial direction of the rotor core 22 so as to penetrate the rotor core 22 and has substantially the same angular range as the pair of the permanent magnets 23. Consequently, with the opening 22c, the magnetic reluctance of the rotor 24 at the central portion of the magnetic pole is increased, thereby increasing the available reluctance torque.

However, with the above configuration, during rotation of the rotor 24, for each of the openings 22c, a radially-outer beam portion 22e of the rotor core 22 which is positioned radially outside the opening 22c will be moved radially outward by the centrifugal force. Consequently, it is impossible to keep the annular air gap formed between the rotor 24 and the stator (not shown) of the motor at the predetermined value.

Figure 12:
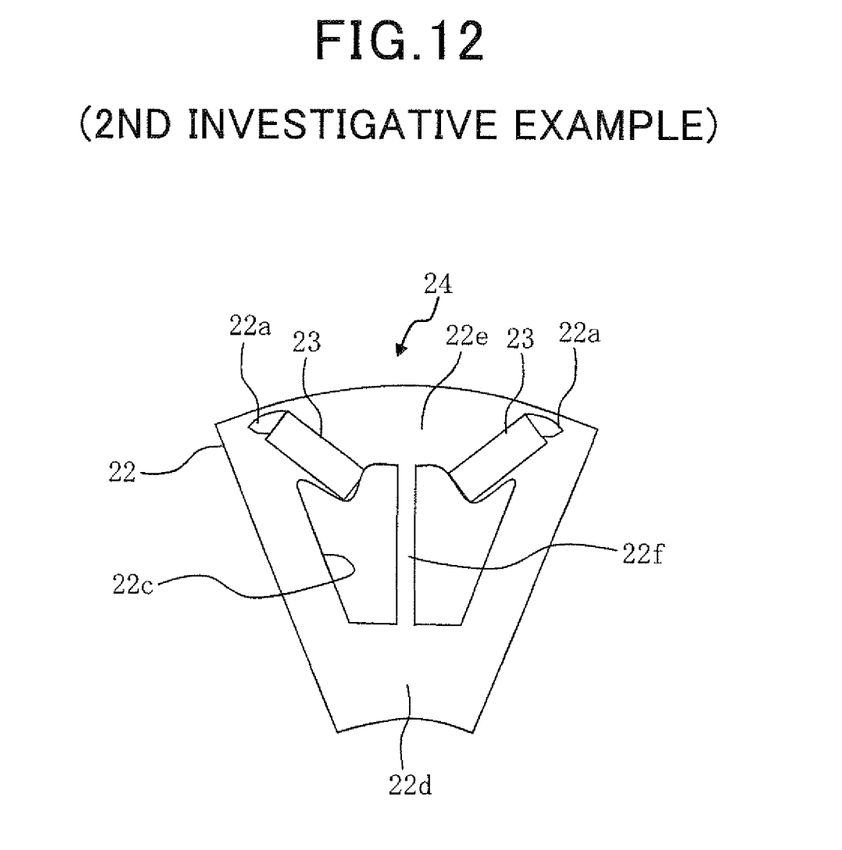
FIG. 12 is an axial end view of part of the rotor according to the second investigative example.

To keep the annular gap at the predetermined value, referring further to FIG. 12, it is possible to provide, for each of the openings 22c, a pier portion 22f for reinforcing the rotor core 22. The pier portion 22f radially extends along a centerline of the opening 22c which bisects the opening 22c in the circumferential direction of the rotor core 22, thereby connecting a pair of radially-inner and radially-outer beam portions 22d and 22e of the rotor core 22 that are respectively positioned radially inside and outside the opening 22c.

However, with the above pier portion 22f, there is the same problem as with the pier portion 12b of FIG. 10. That is, the magnetic flux generated by the corresponding pair of the permanent magnets 23 will leak radially inward via the pier portion 22f, thereby reducing the available reluctance torque.

In addition, to reduce the magnetic flux leakage via the pier portion 22f, one may consider reducing the circumferential thickness of the pier portion 22f. However, in this case, the strength of the rotor core 22 would be accordingly reduced, thereby making it difficult for the rotor core 22 to withstand the centrifugal force during rotation of the rotor 24.

SUMMARY

According to the present invention, there is provided a rotor for an electric rotating machine which includes a hollow cylindrical rotor core and a plurality of permanent magnets. The permanent magnets are embedded in the rotor core so as to form a plurality of magnetic poles on the radially outer periphery of the rotor core. The magnetic poles are arranged at predetermined intervals in the circumferential direction of the rotor core so that the polarities of the magnetic poles alternate between north and south in the circumferential direction. Further, the rotor core has a plurality of openings each of which extends in the axial direction of the rotor core so as to penetrate the rotor core. When viewed along the axial direction of the rotor core, each of the openings is symmetrically positioned with respect to the centerline of a corresponding one of the magnetic poles which bisects the corresponding magnetic pole in the circumferential direction of the rotor core. For each of the openings, there are provided n reinforcing portions, where n is an integer not less than 2. The n reinforcing portions extend to connect a pair of radially-inner and radially-outer peripheral portions of the rotor core which are respectively positioned radially inside and radially outside the opening, thereby partitioning the opening into (n+1) parts. When viewed along the axial direction of the rotor core, the n reinforcing portions are symmetrically arranged with respect to the centerline of the corresponding magnetic pole.

With the openings, the magnetic reluctance at the circumferentially-central portions of the magnetic poles is increased, thereby securing a large reluctance torque of the electric rotating machine. Moreover, with the symmetrically arranged reinforcing portions, the mechanical strength of the rotor core is enhanced. Consequently, during rotation of the rotor, it is possible to prevent the radially-outer peripheral portions of the rotor core from being moved radially outward by the centrifugal force, thereby making it possible to keep a predetermined annular air gap between the rotor and a stator of the electric rotating machine. Furthermore, since there are provided the n reinforcing portions for each of the openings, it is possible to set the circumferential thickness of each of the reinforcing portions small. As a result, it is possible to reduce the magnetic flux leakage via the reinforcing portions in comparison with the case of arranging a single thick reinforcing portion on the centerline of the corresponding magnetic pole along which the magnetic flux is strongest.

Preferably, the rotor core has a plurality of through-holes each of which is formed in the vicinity of the radially outer periphery of the rotor core so as to penetrate the rotor core in the axial direction. Each of the permanent magnets is held in a corresponding one of the through-holes of the rotor core. Each of the reinforcing portions is positioned so as to satisfy the following relationship: $(2-\sqrt{2})L \leq L1 < L$, where L is the distance from an intersection between an imaginary line and a radially outer surface of the rotor core to the centerline of the corresponding magnetic pole, the imaginary line extending so as to be perpendicular to the radially outer surface of the rotor core and tangent to a corresponding one of the through-holes of the rotor core at a point furthest from the centerline of the corresponding magnetic pole, and L1 is the distance from the intersection to a centerline of the reinforcing portion which bisects the circumferential thickness of the reinforcing portion.

It is preferable that n is an even number. It is further preferable that n is equal to 2.

It is also preferable that for each of the openings, the sum of circumferential thicknesses of the n reinforcing portions is set to be less than a predetermined value.

The rotor core is preferably comprised of a plurality of annular magnetic steel sheets that are laminated in the axial direction of the rotor core.

It is also preferable that each of the openings has substantially the same angular range as the corresponding magnetic pole when viewed along the axial direction of the rotor core.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

Figure 1:
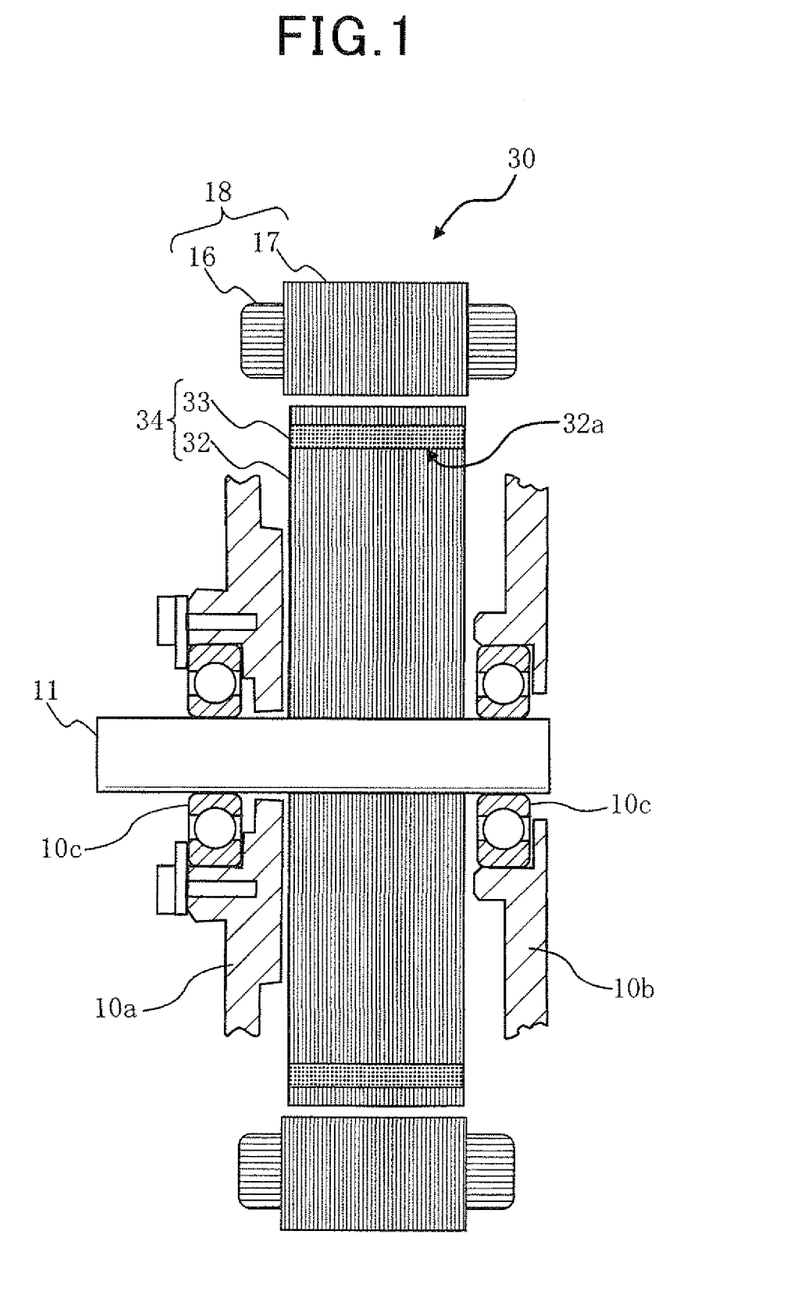
FIG. 1 is a schematic, partially cross-sectional view of an electric rotating machine which includes a rotor according to an embodiment of the invention.

FIG. 1 shows the overall configuration of an electric rotating machine 30 which includes a rotor 34 according to an embodiment of the invention. The electric rotating machine 30 is configured to function, for example, as an electric motor in a hybrid or electric vehicle.

As shown in FIG. 1, the electric rotating machine 30 includes: a pair of front and rear housings 10a and 10b (only partially shown) that are fixed together by means of a plurality of bolts (not shown) and have a pair of bearings 10c respectively arranged therein; a rotating shaft 11 that is rotatably supported by the front and rear housings 10a and 10b via the pair of bearings 10c; the rotor 34 that is fixed on the rotating shaft 11 and received in the front and rear housings 10a and 10b; and a stator 18 that is held between the front and rear housings 10a and 10b and disposed radially outside and coaxially with the rotor 34. In addition, in the present embodiment, the stator 18 functions as an armature while the rotor 34 functions as a field of the electric rotating machine 30.

More specifically, the stator 18 includes a hollow cylindrical stator core 17 and a three-phase stator coil 16.

The stator core 17 has a plurality of slots (not shown) that is formed in the radially inner surface of the stator core 17 and spaced in the circumferential direction of the stator core 17. The stator core 17 is formed by laminating a plurality of annular magnetic steel sheets in the axial direction of the stator core 17.

The stator coil 16 is mounted on the stator core 17 so as to be partially received in the slots of the stator core 17. The stator coil 16 is electrically connected to a three-phase inverter (not shown).

The rotor 34 includes a hollow cylindrical rotor core 32 and a plurality of permanent magnets 33.

The rotor core 32 is coaxially fixed on the rotating shaft 11 so that the radially outer periphery of the rotor core 32 faces the radially inner periphery of the stator core 17 with a predetermined annular gap formed therebetween. The rotor core 32 is formed by laminating a plurality of annular magnetic steel sheets in the axial direction of the rotor core 32.

The permanent magnets 33 are embedded in the rotor core 32 so as to form a plurality of magnetic poles on the radially outer periphery of the rotor core 32. The magnetic poles are arranged in the circumferential direction of the rotor core 32 at predetermined intervals so that the polarities of the magnetic poles alternate between north and south in the circumferential direction. In addition, the number of the magnetic poles is set to be equal to, for example, eight (i.e., four north poles and four south poles) in the present embodiment.

Figure 2:
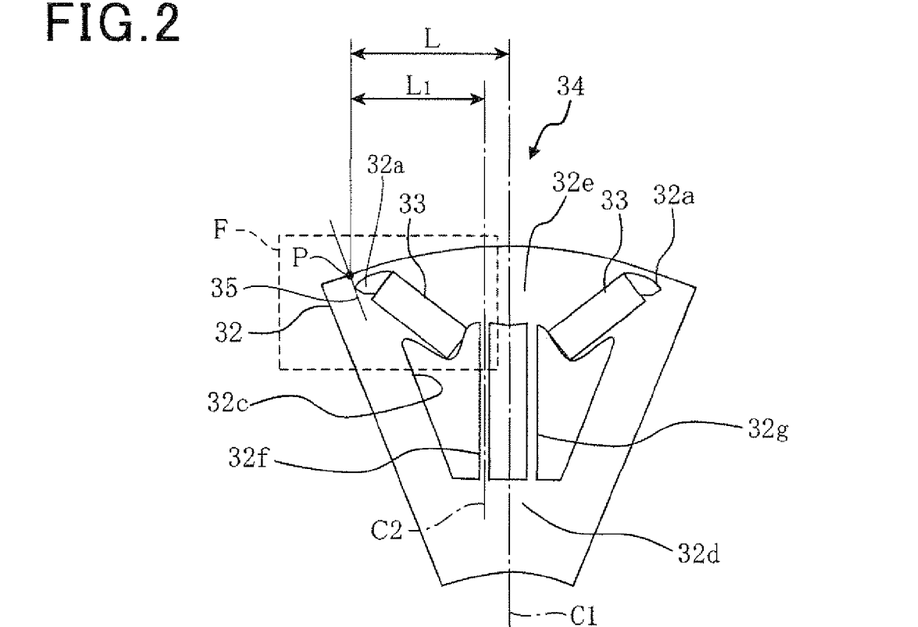
FIG. 2 is an axial end view of part of the rotor.

More specifically, as shown in FIG. 2, in the present embodiment, the rotor core 32 has eight pairs of through-holes 32a formed in the vicinity of the radially outer periphery of the rotor core 32. Each of the through-holes 32a extends in the axial direction of the rotor core 32 to penetrate the rotor core 32. The eight pairs of the through-holes 32a are spaced in the circumferential direction of the rotor core 32 at predetermined intervals. Moreover, each pair of the through-holes 32a is arranged so as to form a substantially truncated V-shape that opens toward the radially outer periphery of the rotor core 32.

Each of the permanent magnets 33 is held in a corresponding one of the through-holes 32a of the rotor core 32 so as to extend in the axial direction of the rotor core 32. Moreover, for each pair of the through-holes 32a of the rotor core 32, the two permanent magnets 33 which are respectively held in the pair of the through-holes 32a are arranged so that the polarities (north or south) of the two permanent magnets 33 are the same on the radially outer side. Consequently, the two permanent magnets 33 together form one of the magnetic poles on the radially outer periphery of the rotor core 32. In addition, as shown in FIG. 2, when viewed along the axial direction of the rotor core 32, the two permanent magnets 33 are symmetrically arranged and extend obliquely with respect to a centerline C1 of the magnetic pole which bisects the magnetic pole in the circumferential direction of the rotor core 32. That is, the two permanent magnets 33 are arranged so as to form a substantially truncated V-shape that opens toward the radially outer periphery of the rotor core 32.

Moreover, in the present embodiment, the rotor core 32 further has a plurality of openings 32c each of which is formed radially inside a corresponding one of the magnetic poles. Each of the openings 32c extends in the axial direction of the rotor core 32 so as to penetrate the rotor core 32 and has substantially the same angular range as the pair of the permanent magnets 33 which form the corresponding magnetic pole. Further, when viewed along the axial direction of the rotor core 32, each of the openings 32c is symmetrically positioned with respect to the centerline C1 of the corresponding magnetic pole.

Furthermore, in the present embodiment, for each of the opening 32c, there is provided a pair of pier portions (or reinforcing portions) 32f and 32g for reinforcing the rotor core 32. The pier portions 32f and 32g extend to connect a pair of radially-inner and radially-outer beam portions (or radially-inner and radially-outer peripheral portions) 32d and 32e of the rotor core 32 which are respectively positioned radially inside and radially outside the opening 32, thereby partitioning the opening 32 into three parts. Further, the pier portions 32f and 32g extend over the entire axial length of the rotor core 32. When viewed along the axial direction of the rotor core 32, the pier portions 32f and 32g are symmetrically arranged with respect to the centerline C1 of the corresponding magnetic pole. In other words, the two pier portions 32f and 32g are respectively arranged on opposite circumferential sides of the centerline C1, not falling on the centerline C1 along which the magnetic flux is strongest. Moreover, the sum of circumferential thicknesses of the two pier portions 32f and 32g is set to be less than the circumferential thickness of the pier portion 22f in the investigative example shown in FIG. 12. Consequently, with the above arrangement of the pier portions 32f and 32g, it is possible to reduce the magnetic flux leakage and thereby increase the reluctance torque in comparison with the investigative example shown in FIG. 12.

Furthermore, in the present embodiment, each of the pier portions 32f and 32g is positioned so as to satisfy the following relationship:

$$(2\sqrt{2})L \leq L1 < L \tag{1},$$

where L is the distance from an intersection P between an imaginary line 35 and the radially outer surface of the rotor core 32 to the centerline C1 of the corresponding magnetic pole, the imaginary line 35 extending so as to be perpendicular to the radially outer surface of the rotor core 32 and tangent to a corresponding one of the through-holes 32a of the rotor core 32 at a point furthest from the centerline C1, and L1 is the distance from the intersection P to a centerline C2 of the pier portion which bisects the circumferential thickness of the pier portion.

Figure 3:
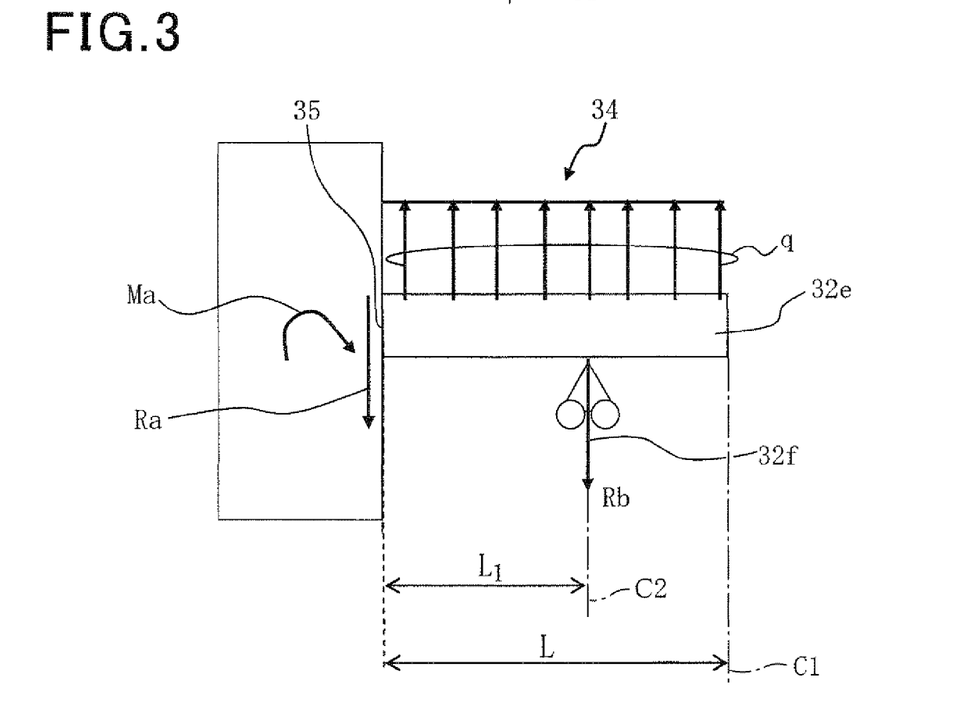
FIG. 3 is a schematic view illustrating the modeling of the area F enclosed with a dashed line in FIG. 2.

The above relationship is determined based on the results of a computer simulation that is conducted based on a model as shown in FIG. 3; the model models the area F enclosed with a dashed line in FIG. 2. It should be noted that though the computer simulation is conducted only for the pier portion 32f, the same results would be obtainable for the pier portion 32g due to the symmetric arrangement of the pier portions 32f and 32g with respect to the centerline C1 of the corresponding magnetic pole.

Specifically, the imaginary line 35 defined in FIG. 2 represents the root of the radially-outer beam portion 32e in FIG. 3. The centerline C2 of the pier portion 32f is distant from the root 35 of the radially-outer beam portion 32e by L1. The centerline C1 of the corresponding magnetic pole is distant from the root 35 of the radially-outer beam portion 32e by L. The load imposed on the radially-outer beam portion 32e due to the centrifugal force during rotation of the rotor 34 is equivalently represented by a uniformly-distributed load F. Further, the bending moment induced at the root 35 of the radially-outer beam portion 32e due to the centrifugal force is denoted by Ma; the reaction force induced at the root 25 due to the centrifugal force is denoted by Ra; the reaction force induced in the pier portion 32f is denoted by Rb.

Then, the bending moment Ma at the root 35 of the radially-outer beam portion 32e can be determined by the following equation:

$$Ma = (-q/8) \times (L1^2 - 4LL1 + 2L^2) \tag{2}$$

Figure 4:
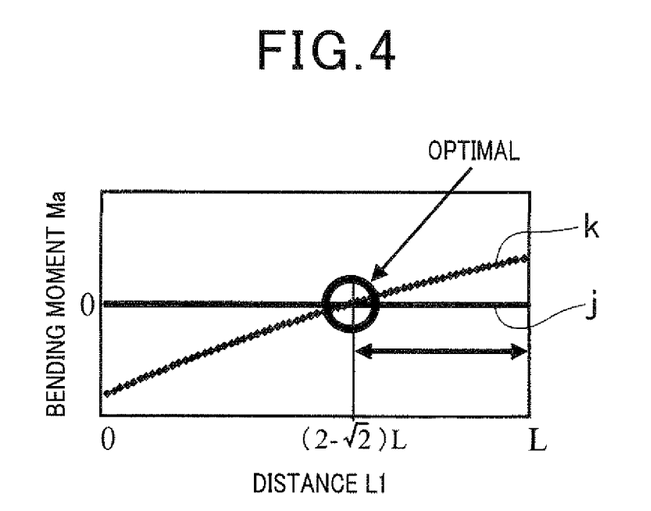
FIG. 4 is a graphical representation illustrating the relationship between a bending moment Ma and a distance L1 in the rotor.

FIG. 4 shows the relationship between the distance L1 from the root 35 of the radially-outer beam portion 32e to the centerline C2 of the pier portion 32f and the bending moment Ma determined by the above equation (2). Specifically, in FIG. 4, the line j represents the bending moment Ma being equal to zero, while the line k represents the bending moment Ma determined by the equation (2). Therefore, the value of L1 at the intersection between the lines j and k (i.e., $(2-\sqrt{2})L$) represents the optimal value of L1 in terms of the bending moment Ma induced at the root 35 of the radially-outer beam portion 32e. In addition, by solving the equation (2), it is possible to obtain two mathematically optimal values of L1 which make the bending moment Ma equal to zero, i.e., $(2\pm\sqrt{2})L$. However, the value $(2+\sqrt{2})L$ falls out of the range (0-L) and thus makes no physical sense. Consequently, it is made clear that to make the bending moment Ma equal to zero, it is necessary to set the distance L1 to be equal to $(2-\sqrt{2})L$.

The reaction force Ra induced at the root 25 of the radially-outer beam portion 32e can be determined by the following equation:

$$Ra = (-q/8) \times \{L1 + 6(L^2/L1) + 4L\} \qquad (3)$$

Figure 5:
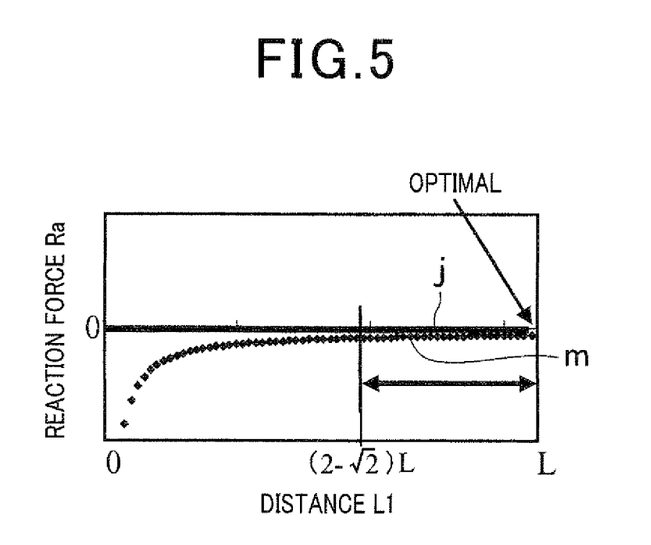
FIG. 5 is a graphical representation illustrating the relationship between a reaction force Ra and the distance L1 in the rotor.

FIG. 5 shows the relationship between the distance L1 and the reaction force Ra determined by the above equation (3). Specifically, in FIG. 5, the line j represents the reaction force Ra being equal to zero, while the line m represents the reaction force Ra determined by the equation (3). It can be seen that in the range (0-L) for the distance L1, the line m can closely approach but cannot intersect the line j. In addition, by solving the equation (3), it is possible to obtain two mathematically optimal values of L1 which make the reaction force Ra equal to zero, i.e., $\pm\sqrt{6}L$. However, both the values $\pm\sqrt{6}L$ fall out of the range (0-L) and thus make no physical sense. Consequently, it is made clear that to minimize the reaction force Ra, it is necessary to set the distance L1 as close to L as possible.

The reaction force Rb induced in the pier portion 32f can be determined by the following equation:

$$Rb = (-q/8) \times \{L1 + 6(L^2/L1) + 4L\} \qquad (4)$$

Figure 6:
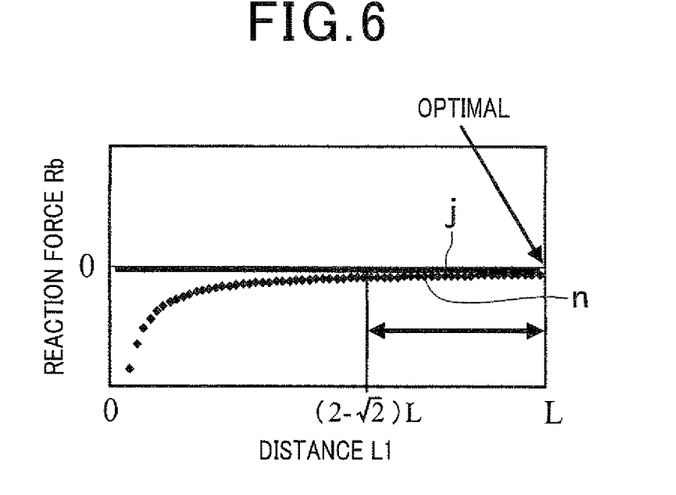
FIG. 6 is a graphical representation illustrating the relationship between a reaction force Rb and the distance L1 in the rotor.

FIG. 6 shows the relationship between the distance L1 and the reaction force Rb determined by the above equation (4). Specifically, in FIG. 6, the line j represents the reaction force Rb being equal to zero, while the line n represents the reaction force Rb determined by the equation (4). It can be seen that in the range (0-L) for the distance L1, the line n can closely approach but cannot intersect the line j. In addition, by solving the equation (4), it is possible to obtain two mathematically optimal values of L1 which make the reaction force Rb equal to zero, i.e., $\pm\sqrt{6}L$. However, as described previously, both the values $\pm\sqrt{6}L$ fall out of the range (0-L) and thus make no physical sense. Consequently, it is made clear that to minimize the reaction force Rb, it is necessary to set the distance L1 as close to L as possible.

In view of the above results, in the present embodiment, as described previously, each of the pier portions 32f and 32g is positioned in the rotor core 32 so as to satisfy the relationship of $(2-\sqrt{2})L \leq L1 < L$.

Figure 7:
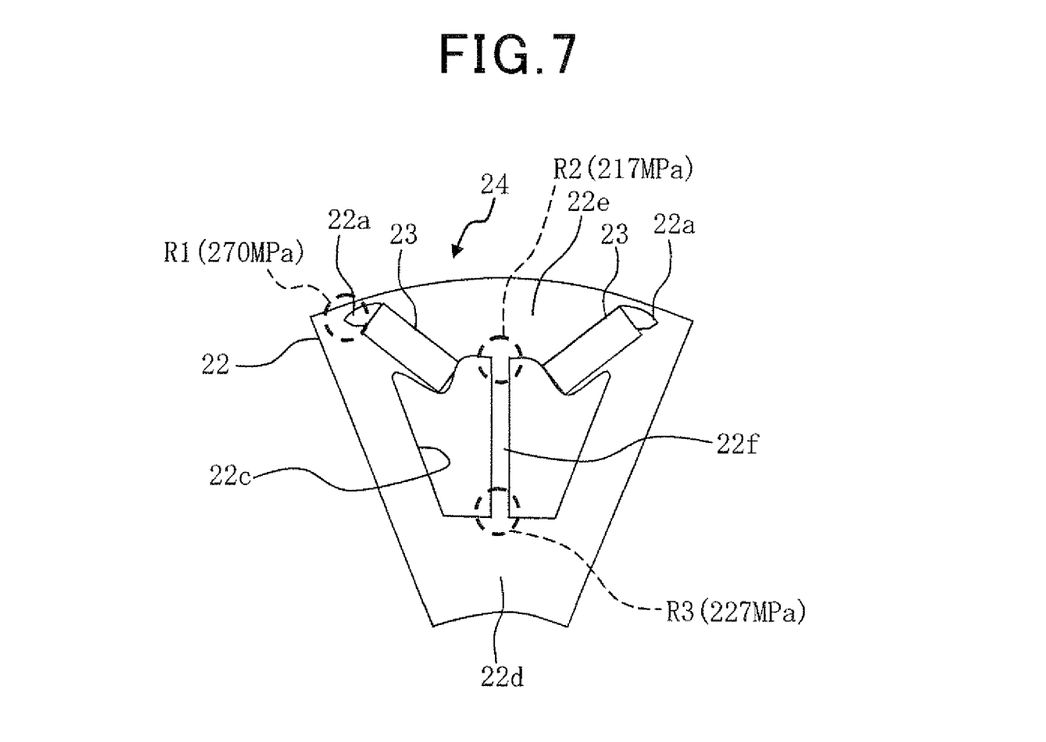
FIG. 7 is a schematic view showing stresses induced at different areas in a rotor according to a second investigative example.

FIG. 7 shows stresses induced in different areas in the rotor 24 according to the investigative example which has been previously described with reference to FIG. 12.

As shown in FIG. 7, in the rotor 24, the stress induced in a root area R1 of the radially-outer beam portion 22e during rotation of the rotor 24 is equal to 270 MPa; the stress induced in a boundary area R2 between the pier portion 22f and the radially-outer beam portion 22e is equal to 217 MPa; the stress induced in a boundary area R3 between the pier portion 22f and the radially-inner beam portion 22d is equal to 227 MPa.

Figure 8:
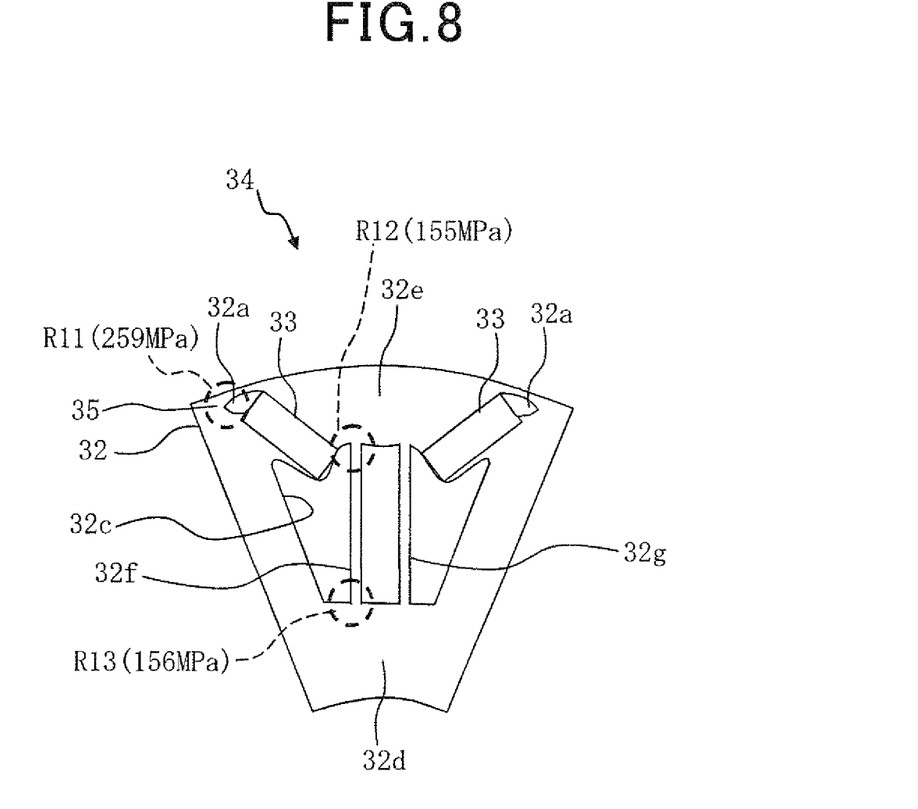
FIG. 8 is a schematic view showing stresses induced at different areas in the rotor according to the embodiment of the invention.

FIG. 8 shows stresses induced in different areas in the rotor 34 according to the present embodiment when the rotor 34 rotates at the same speed as the rotor 24 according to the investigative example. In addition, in FIG. 8, the distance L1 is set to be equal to $(2-\sqrt{2})L$.

As shown in FIG. 8, in the rotor 34, the stress induced in a root area R11 of the radially-outer beam portion 32e during rotation of the rotor 34 is equal to 259 MPa; the stress induced in a boundary area R12 between the pier portion 32f and the radially-outer beam portion 32e is equal to 155 MPa; the stress induced in a boundary area R13 between the pier portion 32f and the radially-inner beam portion 32d is equal to 156 MPa.

Accordingly, it is made clear that the stresses induced in the rotor 34 according to the present embodiment are considerably reduced in comparison with the rotor 24 according to the investigative example.

After having described the overall configuration of the rotor 34 according to the present embodiment, advantages thereof will be described hereinafter.

In the present embodiment, the rotor core 32 has the openings 32c each of which extends in the axial direction of the rotor core 32 so as to penetrate the rotor core 32. Further, each of the openings 32c is symmetrically positioned with respect to the centerline C1 of a corresponding one of the magnetic poles which bisects the corresponding magnetic pole in the circumferential direction of the rotor core 32.

With the openings 32c, the magnetic reluctance of the rotor 34 at the circumferentially-central portions of the magnetic poles is increased, thereby securing a large reluctance torque of the electric rotating machine 30.

Moreover, in the present embodiment, for each of the openings 32c, there are provided a pair of the pier portions 32f and 32g for reinforcing the rotor core 32. The pier portions 32f and 32g extend to connect the radially-inner and radially outer beam portions 32d and 32e which are respectively positioned radially inside and radially outside the opening 32c, thereby partitioning the opening 32c into three parts. Further, when viewed along the axial direction of the rotor core 32, the pier portions 32f and 32g are symmetrically arranged with respect to the centerline C1 of the corresponding magnetic pole.

With the symmetrically arranged pier portions 32f and 32g, the mechanical strength of the rotor core 32 is enhanced. As a result, during rotation of the rotor 34, it is possible to prevent the radially-outer beam portions 32e of the rotor core 32 from being moved radially outward by the centrifugal force, thereby making it possible to keep the annular air gap between the rotor 34 and the stator 18 at the predetermined value.

In the present embodiment, each of the pier portions 32f and 32g is positioned so as to satisfy the relationship of $(2-\sqrt{2})L \leq L1 < L$.

Positioning the pier portions 32f and 32g as above, it is possible to minimize stresses induced in the rotor core 32 during rotation of the rotor 34.

In the present embodiment, the number of the pier portions 32f and 32g provided for each of the openings 32c is equal to 2, which is an even number.

Consequently, the two pier portions 32f and 32g are respectively arranged on opposite circumferential sides of the centerline C1 of the corresponding magnetic pole. Accordingly, there is no pier portion arranged on the centerline C1 along which the magnetic flux is strongest. As a result, it is possible to reduce the magnetic flux leakage and thereby increase the reluctance torque in comparison with the investigative example shown in FIG. 12.

In addition, since there are provided only the two pier portions 32f and 32g for each of the openings 32c, it is possible to secure sufficiently large effect of the openings 32c on increasing the magnetic reluctance at the circumferentially-central portions of the magnetic poles.

In the present embodiment, for each of the openings 32c, the sum of circumferential thicknesses of the two pier portions 32f and 32g provided for the opening 32c is set to be less than a predetermined value, more particularly less than the circumferential thickness of the single pier portion 22f in the investigative example shown in FIG. 12.

Setting the sum of circumferential thicknesses of the pier portions 32f and 32g as above, it is possible to reliably reduce the magnetic flux leakage and thereby increase the reluctance torque in comparison with the investigative example shown in FIG. 12.

In the present embodiment, the rotor core 32 is comprised of a plurality of annular magnetic steel sheets that are laminated in the axial direction of the rotor core 32.

Consequently, it is possible to easily realize the configuration of the rotor core 32 according to the present embodiment by first forming (e.g., by punching) each of the annular magnetic steel sheets to have the shape as shown in FIG. 2 and then laminating them in the axial direction.

In the present embodiment, each of the openings 32c is formed to have substantially the same angular range as the corresponding magnetic pole (more precisely, as the pair of the permanent magnets 33 which form the corresponding magnetic pole).

With the above formation of the openings 32c, it is possible to maximize the effect of the openings 32c on increasing the magnetic reluctance at the circumferentially-central portions of the magnetic poles.

While the above particular embodiment of the present invention has been shown and described, it will be understood by those skilled in the art that various modifications, changes, and improvements may be made without departing from the spirit of the invention.

For example, in the previous embodiment, each of the magnetic poles is formed by the pair of the permanent magnets 33 arranged as shown in FIG. 2. However, each of the magnetic poles may also be formed by a single permanent magnet which has its north and south poles arranged to respectively face toward opposite radial directions of the rotor core 32.

Moreover, in the previous embodiment, for each of the openings 32e, there are provided the two pier portions 32f and 32g. However, it is also possible to provide three or more pier portions for each of the openings 32c provided that those pier portions are symmetrically arranged with respect to the centerline C1 of the corresponding magnetic pole. Further, in this case, it is preferable that the sum of circumferential thicknesses of the three or more pier portions is set to be less than the circumferential thickness of the single pier portion 22f in the investigative example shown in FIG. 12.

What is claimed is:

1. A rotor for an electric rotating machine, the rotor comprising:
    a hollow cylindrical rotor core; and
    a plurality of permanent magnets embedded in the rotor core so as to form a plurality of magnetic poles on a radially outer periphery of the rotor core, the magnetic poles being arranged at predetermined intervals in a circumferential direction of the rotor core so that polarities of the magnetic poles alternate between north and south in the circumferential direction,
    wherein
    the rotor core has a plurality of openings each of which extends in the axial direction of the rotor core so as to penetrate the rotor core,
    when viewed along the axial direction of the rotor core, each of the openings is symmetrically positioned with respect to a centerline of a corresponding one of the magnetic poles which bisects the corresponding magnetic pole in the circumferential direction of the rotor core,
    for each of the openings, there are provided n reinforcing portions, where n is an integer not less than 2,
    the n reinforcing portions extend to connect a pair of radially-inner and radially-outer peripheral portions of the rotor core which are respectively positioned radially inside and radially outside the opening, thereby partitioning the opening into (n+1) parts,
    such that in the radially-inner and radially-outer peripheral portions of the rotor core connected by the n reinforcing portions, only the radially-inner peripheral portion of the rotor core is positioned radially inside the permanent magnets forming the corresponding magnetic pole, and
    when viewed along the axial direction of the rotor core, the n reinforcing portions are symmetrically arranged with respect to the centerline of the corresponding magnetic pole and positioned closer to the centerline of the corresponding magnetic pole than the permanent magnets forming the corresponding magnetic pole.

2. The rotor as set forth in claim 1, wherein the rotor core has a plurality of through-holes each of which is formed in the vicinity of the radially outer periphery of the rotor core so as to penetrate the rotor core in the axial direction,
    each of the permanent magnets is held in a corresponding one of the through-holes of the rotor core, and
    each of the reinforcing portions is positioned so as to satisfy the following relationship:

$$(2-\sqrt{2})L \leq L1 \leq L,$$

where L is the distance from an intersection between an imaginary line and a radially outer surface of the rotor core to the centerline of the corresponding magnetic pole, the imaginary line extending so as to be perpendicular to the radially outer surface of the rotor core and tangent a corresponding one of the through-holes of the rotor core at a point furthest from the centerline of the corresponding magnetic pole, and L1 is the distance from the intersection to a centerline of the reinforcing portion which bisects the circumferential thickness of the reinforcing portion.

3. The rotor as set forth in claim 1, wherein n is an even number.

4. The rotor as set forth in claim 3, wherein n is equal to 2.

5. The rotor as set forth in claim 1, wherein for each of the openings, the sum of circumferential thicknesses of the n reinforcing portions is set to be less than a predetermined value.

6. The rotor as set forth in claim 1, wherein the rotor core is comprised of a plurality of annular magnetic steel sheets that are laminated in the axial direction of the rotor core.

7. The rotor as set forth in claim 1, wherein each of the openings has substantially the same angular range as the corresponding magnetic pole when viewed along the axial direction of the rotor core.

8. The rotor as set forth in claim 1, wherein each of the magnetic poles is formed of two of the permanent magnets which are spaced from each other in the circumferential direction of the rotor core and symmetrically arranged with respect to the centerline of the magnetic pole, and
    of the radially-inner and radially-outer peripheral portions of the rotor core connected by the n reinforcing portions, the radially-outer peripheral portion of the rotor core is interposed between the two permanent magnets forming the corresponding magnetic pole.

* * * * *